May 25, 1943.  O. D. H. BENTLEY  2,319,913
THRUST BEARING
Filed March 27, 1941
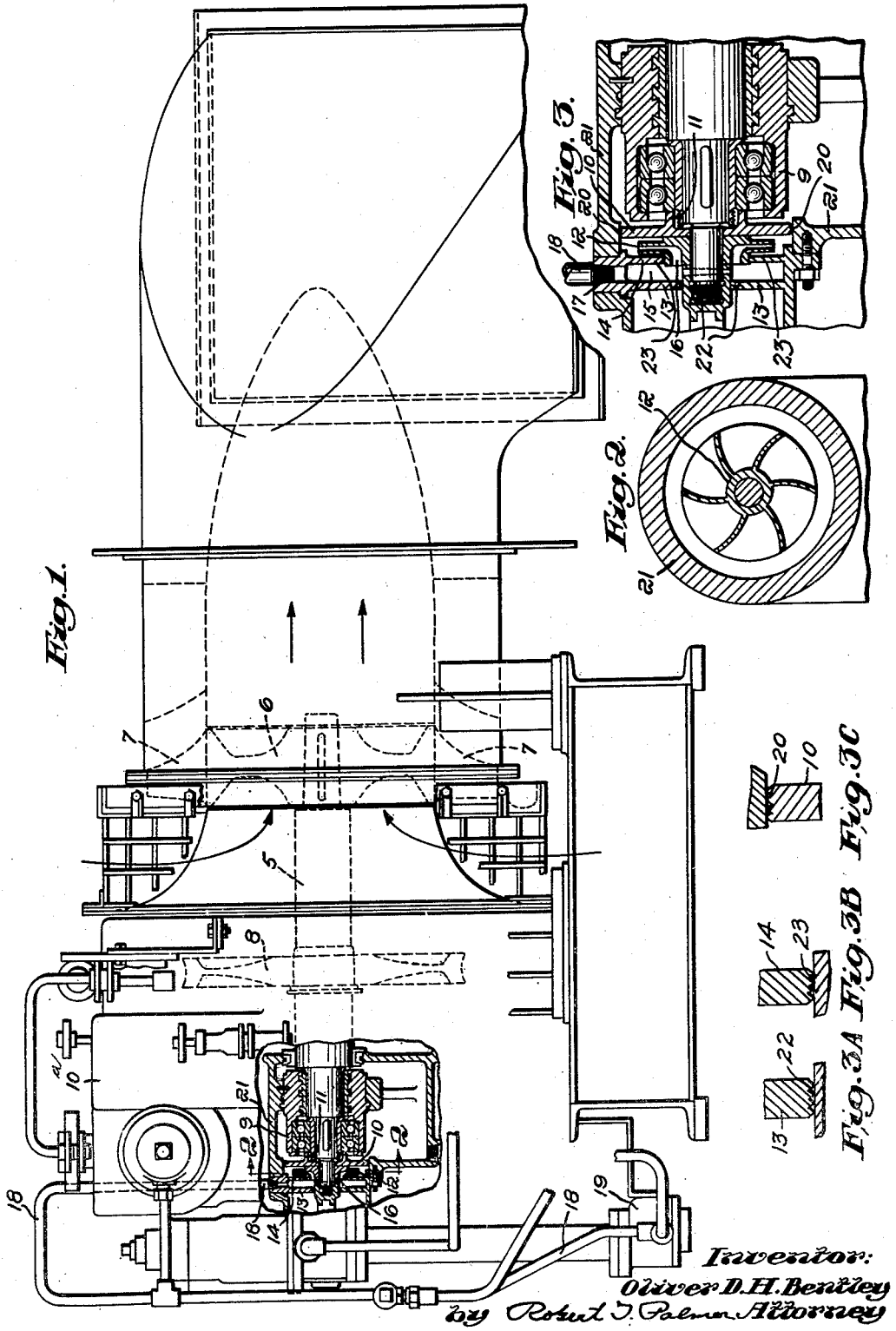
Inventor:
Oliver D. H. Bentley
by Robert T. Palmer Attorney Patented May 25, 1943

2,319,913

UNITED STATES PATENT OFFICE 2,319,913

THRUST BEARING

Oliver D. H. Bentley, Norfolk, Mass., assignor to B. F. Sturtevant Company, Boston, Mass.

Application March 27, 1941, Serial No. 385,511

5 Claims. (Cl. 308—9)

This invention relates to thrust bearings and relates more particularly to methods and means for removing the thrust pressures from thrust bearings.

Propeller fans directly connected to steam turbines are used extensively on navel vessels, such for example as battle ships or destroyers, for forced draft blower duties. Recent improvements in the propeller fans have resulted in their being rotated to deliver air at high pressures which were thought impossible but a short time ago. For example, the propeller wheels on such blowers have been operated in the past to deliver air to the combustion chambers of the steam boilers of a destroyer at 25 inches pressure. Much higher pressures are now desired.

The desired performances however result in such extremely high thrust pressures upon the thrust bearings that the ordinary thrust bearings and insufficient and in fact, their incapacity to withstand the high pressures, has been the limiting factor in designing the blowers for developing the high pressures. For example, the thrust pressure in the foregoing example is 500 pounds per square inch. Blower performances resulting in the delivery of air at 50 inches pressure and resulting in 2000 pounds thrust pressure, are now contemplated. Prior thrust bearings would not stand up under such pressures.

This invention provides a thrust bearing in which a balancing pressure is built up to oppose the thrust pressure. In one embodiment of the invention, an annular member is mounted in contact with the bearing, on the rotary shaft of the blower adjacent the end thereof which extends through the thrust bearing, and a centrifugal oil pump mounted at said end of the shaft so that its impeller rotates therewith, pumps oil against the annular member to provide a pressure against same in opposition to the thrust pressure resulting from the operation of the blower. The thrust pressure from the blower varies as the square of the blower speed and the pressure from the centrifugal pump varies as the square of its speed and since both blower and pump are driven by the same shaft, the varying thrust pressures are opposed by conformably varying oil pressures throughout the entire range of blower speeds. The invention contemplates that all or any desired portion of the thrust pressure may be relieved.

An object of the invention is to reduce the thrust pressure upon thrust bearings.

Another and more definite object of the invention is to relieve the thrust pressure upon thrust bearings by providing an opposing pressure.

The invention will now be described with reference to the drawing, of which:

Fig. 1 is an outline drawing of a turbine driven blower with a portion broken away illustrating one embodiment of this invention;

Fig. 2 is an enlarged sectional view along the lines 2—2 of Fig. 1;

Fig. 3 is an enlarged view of the broken away portion of Fig. 1;

Fig. 3A is an enlarged view of the lower portion of the member 13 of Fig. 3 and illustrates the serrated lower edge thereof;

Fig. 3B is an enlarged view of the lower portion of the member 14 of Fig. 3 and illustrates the serrated lower edge thereof, and Fig. 3C is an enlarged view of the upper portion of the flange 10 of Fig. 3 and illustrates the serrated upper edge thereof.

The rotary shaft 5 has mounted thereon the blower wheel 6 having the propeller blades 7 and the turbine impeller 8. The roller thrust bearing 9 is contained within the turbine casing 10a adjacent the inner end of the shaft 5. The thrust pressure due to the movement of air by the blades 7, in the direction illustrated by the arrows of Fig. 1 is in the opposite direction towards the bearing 9 which in its self is unable to withstand the extremely high thrust pressures involved.

The rotary, annular flange 10 is attached to the shaft 5 between the bearing 9 and the inner, thrust end of the shaft and has the outer extension 11 which is in contact with the inner end of the bearing and serves to hold the bearing in position on the shaft. The centrifugal pump impeller 12 is mounted between the inner end of the shaft and the flange 10. The partitions 13 and 14 provide an oil passage 15 to the inlet 16 of the pump. The passage 15 is connected through the oil inlet 17 and the tube 18 to the gear pump 19 which is a part of the turbine lubricating system, and which supplies oil to the pump impeller 12 when the turbine is operating.

The annular member 10 is of relatively soft metal, such as brass and its periphery is serrated at 20 and is in contact with the walls 21 to form an oil seal. The inner ends of the partitions 13 and 14 are likewise serrated at 22 and 23 respectively for preventing oil leakage from the passage 15.

In operation, the impeller 12 delivers oil which exerts pressure against the flange 10 and through it upon the shaft 5, and through the extension 11, against the bearing 9 in a direction opposing the thrust pressure from the blower and extending in lines parallel to the axis of the shaft 5.

The oil pressure from the impeller 12 varies with the square of its speed of rotation. The blower air pressure and the thrust pressure from the blower adjacent the bearing 9 also vary with the square of the speed of rotation. Since both the pump and the blower are rotated on the same shaft, it is apparent that the balancing pressure provided by the centrifugal pump varies conformably with the thrust pressure from the blower, against the thrust bearing. It is preferred that the gear pump 19 provide no pressure to add to that from the centrifugal pump so that the balancing pressure is proportional to the thrust pressure.

The centrifugal pump impeller 12 and its cooperating structure may be designed to provide balancing pressures equal to the thrust pressures; may be designed to provide balancing pressure less than the thrust pressures for permitting the use of the conventional thrust bearings which without this invention could not withstand the total thrust pressures developed or may be designed to provide opposing pressures greater than the thrust pressures.

While one embodiment of the invention has been described for the purpose of illustration, it should be understood that the invention is not limited to the exact apparatus illustrated, as modifications thereof may be suggested by those skilled in the art without departure from the essence of the invention.

What is claimed is:

1. In a thrust bearing assembly including a rotary shaft, a thrust bearing around said shaft adjacent the thrust end thereof, and a wall around said bearing and shaft, a fluid pump having its impeller connected to said shaft for rotation therewith, between said bearing and said thrust end, an annular flange mounted on said shaft between said bearing and said shaft end, for rotation therewith and having an inner portion in contact with the end of said bearing nearest said shaft end and having an outer portion in contact with said wall, an annular partition extending from said wall and contacting said impeller at the shaft end thereof, and means including said wall and said partition for directing the fluid from said pump against said flange for producing a pressure upon said bearing for opposing the thrust from said shaft thereagainst.

2. In a thrust bearing assembly including a rotary shaft, a thrust bearing around said shaft adjacent the thrust end thereof, a wall around said bearing and shaft, means forming a fluid pump having an impeller attached to said shaft between said bearing and said thrust end, for rotation with said shaft, said impeller having an axial inlet positioned towards said end, an annular flange attached to said shaft between said impeller and said bearing, for rotation with said shaft, an annular partition extending from and contacting said impeller, around said inlet, to and contacting said wall, and means including said wall and said partition for directing the fluid from said impeller against said flange for producing a pressure thereagainst opposing the thrust from said shaft upon said bearing.

3. In a motor driven blower including a rotary shaft and thrust bearing around said shaft adjacent the thrust end thereof, means forming a fluid pump having an impeller attached to said shaft between said bearing and said thrust end, for rotation with said shaft, said impeller having an axial inlet positioned towards said end and having a circumferentially extending outlet, said blower producing a thrust against said bearing, which varies with the square of the speed of its rotor, said pump producing a fluid pressure which varies with the square of the speed of its impeller, an annular flange attached to said shaft between said impeller and said bearing, for rotation with said shaft, and means including said flange and including stationary guide walls forming an enclosure around said outlet whereby the fluid from said impeller is directed against said flange for producing a pressure thereagainst opposing the thrust from said shaft upon said bearing.

4. In a motor driven blower including a rotary shaft and a thrust bearing in said motor, around said shaft adjacent the thrust end thereof, said motor having a lubricating oil supply and a pump for circulating the oil from said supply, means forming a centrifugal oil pump having its inlet connected to the outlet of said pump and having an impeller attached to said shaft between said bearing and said thrust end, for rotation with said shaft, said blower producing a thrust against said bearing, which varies with the square of the speed of its rotor, said centrifugal pump producing a fluid pressure which varies with the square of the speed of its impeller, an annular flange attached to said shaft between said impeller and said bearing, for rotation with said shaft, and means for directing the fluid from said impeller against said flange for producing a pressure thereagainst opposing the thrust from said shaft upon said bearing.

5. In a thrust bearing assembly including a rotary shaft and a roller thrust bearing having an inner race around said shaft adjacent the thrust end thereof, stationary guide walls around said bearing and shaft, a fluid pump having its impeller connected to said shaft between said bearing and said shaft end for rotation therewith, an annular flange mounted on said shaft between said bearing and said shaft end, for rotation therewith and having a portion in contact with the end and having an outer portion in contact with one of said walls of said race nearest said shaft end, and means including said walls for directing the fluid from said pump against said flange for producing a pressure thereagainst opposing the thrust from said shaft upon said bearing.

OLIVER D. H. BENTLEY.